US010788988B1

(12) United States Patent
Lary et al.

(10) Patent No.: US 10,788,988 B1
(45) Date of Patent: Sep. 29, 2020

(54) CONTROLLING BLOCK DUPLICATES (71) Applicant: VIOLIN SYSTEMS LLC, San Jose, CA (US)

(72) Inventors: Richard F. Lary, Colorado Springs, CO (US); Bill Wong, Colorado Springs, CO (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 127 days.

(21) Appl. No.: 15/604,427

(22) Filed: May 24, 2017

Related U.S. Application Data

(60) Provisional application No. 62/340,749, filed on May 24, 2016.

(51) Int. Cl.
*G06F 12/00* (2006.01)
*G06F 3/06* (2006.01)
*H04L 9/32* (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0641* (2013.01); *H04L 9/3236* (2013.01)

(58) Field of Classification Search
CPC .... G06F 3/0608; G06F 3/0619; G06F 3/0641; G06F 3/065; G06F 3/067
See application file for complete search history.

(56) References Cited

U.S. PATENT DOCUMENTS

| | | | |
|---|---|---|---|
| 8,589,640 B2* | 11/2013 | Colgrove | G06F 3/0608 711/156 |
| 8,688,652 B2 | 4/2014 | Baldwin et al. | |
| 8,725,969 B2 | 5/2014 | Hasegawa | |
| 8,782,340 B2 | 7/2014 | Lary | |
| 8,862,845 B2 | 10/2014 | Lary et al. | |
| 8,935,487 B2* | 1/2015 | Sengupta | G06F 12/0862 711/154 |
| 9,569,357 B1 | 2/2017 | Shalev et al. | |
| 2012/0158674 A1* | 6/2012 | Lillibridge | G06F 16/13 707/692 |
| 2012/0197851 A1 | 8/2012 | Leppard | |
| 2014/0074804 A1 | 3/2014 | Colgrove et al. | |
| 2015/0363457 A1 | 12/2015 | Chambliss et al. | |

(Continued)

OTHER PUBLICATIONS

Kim, D., et al., Data Deduplication for Data Optimization for Storage and Network Systems, pp. 23-77, Switzerland, Sep. 8, 2016.

*Primary Examiner* — Gurtej Bansal
(74) *Attorney, Agent, or Firm* — Schwabe Williamson & Wyatt (57) ABSTRACT

A system and associated methodology for controlling block duplicates when deduplicating data (Dedup Blocks) to a storage space. The system includes a persistent database of known duplicates stored in the storage space (KD Table), and a non-persistent database of possible duplicates stored in the storage space (PD Table). Computer logic executes programming instructions stored in memory that are configured to index the KD Table according to a value derived from bits of a Dedup Block's hash signature, to index the PD Table according to another value derived by other bits of the Dedup Block's hash signature, to demote known duplicates from the KD Table to the PD Table, and to promote possible duplicates from the PD Table to the KD Table.

15 Claims, 9 Drawing Sheets

(56) References Cited

U.S. PATENT DOCUMENTS

2017/0103068 A1   4/2017  Araki et al.
2017/0123712 A1   5/2017  Li et al.
2017/0124107 A1   5/2017  Emberson \* cited by examiner

Target

|  | 0 | unique | duplicate |
|---|---|---|---|
| unique | allocate | write | decr target TRC, if →1, then KD→target |
|  | write | SIG→PD | allocate |
|  | SIG→PD |  | write |
|  |  |  | SIG→PD |
| duplicate | incr KD TRC | deallocate | decr target TRC, if →1, then KD→target |
|  | map target to KD | incr KD TRC | incr KD TRC |
|  |  | map target to KD | map target to KD |

New Data (row label, spanning unique and duplicate rows)

CONTROLLING BLOCK DUPLICATES

RELATED APPLICATION

This application claims benefit to the earlier filing date of the U.S. provisional patent application Ser. No. 62/340,749 entitled AN IMPROVED METHOD FOR DETECTING BLOCK DUPLICATES IN A BLOCK STORAGE CONTROLLER that was filed on May 24, 2016.

FIELD

The present embodiments relate generally to the field of digital data storage and more particularly, without limitation, to controlling block duplicates in a data storage space.

BACKGROUND

Digital data deduplication (dedup) provides a way of increasing the apparent size of a data storage space by only storing a single copy of data where otherwise there would be duplicate stored copies. Generally, dedup is performed by a processor-based system, such as a data storage controller having access to shared data space, executing computer instructions to determine whether, in an input/output ("I/O") stream, an incoming block of data (known here as a Dedup Block) is equal to some other Dedup Block that was previously written to the storage space. The storage space generally consists of solid-state disks (SSDs), which are very fast and expensive storage, so consuming some disk performance for larger effective capacity is a good trade. Previously attempted solutions have employed various techniques using large (crypto) signature or small (non-crypto) signatures of disk data as proxies, because direct comparison of incoming data with all existing disk data is clearly infeasible.

The large signature technique uses a large, cryptographically secure signature value as a proxy for the block contents, and compares signatures instead of comparing blocks. At first glance this appears dangerous—two Dedup Blocks can produce the same signature and give a false indication of equality. However, for sufficiently large and well-mixed signatures the mathematical probability of this is vanishingly small. The probability that a collection of N objects, each of which can have one of V uniformly distributed signatures, will contain two (or more) objects with the same signature is approximated by this formula:

$$p \cong \frac{N^2}{2V}, \text{ for } V \text{ large and } N < \sqrt{V}$$

A well-mixed signature that produces a result of B bits should produce one of $2^B$ uniformly distributed signatures, and the commonly used signature algorithms have all been tested against this assumption. For example, assuming a 20-byte signature (B=160) and 17.5 billion ($2^{34}$) stored Dedup Blocks (~145 TB of deduplicated storage with 8 KiB Dedup Blocks), then the probability that two unequal stored Dedup Blocks have the same signature is given by:

$$p \cong 2^{-93} \approx 10^{-28}$$

This is such a small probability that a million installations of a system this large could each introduce a completely new collection of 17.5 billion Dedup Blocks every second for a thousand years and not have even a 0.00001% chance of any of them detecting a false duplicate. The common signature codes that produce at least a 160-bit signature are the cryptographic signature codes, like SHA-1 (160 bits) and SHA-2 (224 or 256 bits). Since 160 bits appears to be enough to guarantee data integrity, one could truncate all SHA hashes to that length and treat all crypto signatures as 160 bits long. A problem with cryptographic signatures is that they are CPU-intensive to compute. SHA-1 takes about 11 CPU ticks per byte, or about 32 uS on a modern (circa 2017) processor, to compute the hash signature of an 8 KiB Dedup Block; SHA2-256 is about 30% slower than that. Truncating the larger SHA hashes to produce a 160-bit result doesn't speed them up.

The small (non-crypto) signature techniques use a small signature as a filtering proxy for the Dedup Blocks and compare these signatures. If the signatures are not equal, the blocks are not equal. If the signatures are equal, the blocks might be equal; the block contents must be compared to see if they are truly equal. Examples of small signature hashes are Murmur (64-bit), FarmHash (64- or 128-bit), xxHash (64-bit), and MetroHash (64- or 128-bit). These signatures are not suitable to act as a proxy for the sector data in the same way as a signature based on a crypto hash. They are marginally large enough to be such a proxy ($p=10^{18}$ for a 128-bit signature), but they can be spoofed. That is, a little bit of work by a skilled malicious user can create two different block contents that have the same signature, and thus cause data corruption. Therefore these small signatures must only be used as a filtering proxy for the data—if the hashes of two Dedup Blocks are unequal then the blocks are unequal, but if the hashes are equal the data of the Dedup Blocks must be compared to determine equality.

The advantage of employing small signatures is that they don't need a lot of processor (CPU) overhead. MetroHash, fastest of all, computes the signature of an 8 KiB Dedup Block in under 0.9 uS/block on a modern processor. If the signatures match, then confirming that the Dedup Blocks are actually equal will add an I/O operation to read the previously stored Dedup Block, whether the match is real or not. Even if as many as 5% of write operations actually write duplicate data (a conservative estimate), that would effectively add 5% of the cost of an 8 KiB SSD read and an 8 KiB memory-memory compare to the cost of the hash. With modern SSDs, this means the total cost of the comparison is about 0.5*20 uS+0.9 uS=1.9 uS. That is significantly less than the 5-8 uS cost of the large signature techniques.

Assuming that an illustrative non-crypto hash exhibits good random mixing properties, the probability that an incoming Dedup Block will waste time reading a stored Dedup Block that it actually does not match (spoofing, a false match) is roughly given by:

$$P(\text{wasted compare}) = \frac{(\text{stored dedup blocks})}{2^{(\text{bits in hash})}}$$

In the example of 17.7 billion ($2^{34}$) stored Dedup Blocks covering 145 TB of deduped data, any hash signature of at least 44 bits will cause less than one unnecessary compare from a stored Dedup Block per thousand hashes, causing negligible performance degradation due to spoofing.

Now while hash signatures of various sorts are used to determine whether an incoming Dedup Block is a duplicate of some other Dedup Block, dedup in toto requires efficiently determining whether such a match exists with any of several million or billion already-stored Dedup Blocks. This requires a layer of data structures and computer logic providing for dedup that is scalable, fast, accurate, and revisible. Scalability permits processing many billions of stored Dedup Blocks in the storage space, despite the inherent space limitations of DRAM. Speed depends on how the dedup system tolerates false negatives. Accuracy provides that there are never any false positives. Revisibilty provides low processing costs of adding a new Dedup Block to or removing a stored Dedup Block from the data storage space.

The biggest cost of previously attempted dedup solutions is the usage and maintenance of a persistent database of signatures. For example, in some attempts every Dedup Block of every write operation requires a lookup in that database, and because the database is much larger than DRAM memory and signatures display no locality (they would be bad signatures if they did) the cache hit rate of any DRAM cache of the database will be the ratio of the cache size to the size of the database table, which is generally small. So most incoming Dedup Blocks require at least one database read to determine if the data is a duplicate. If the incoming Dedup Block has a unique value (which is most of the time), it must be added to the database, which requires at least two database writes (for reliability). In addition, when a Dedup Block on media is overwritten, its signature must be removed from the database. This requires reading the Dedup Block, computing its signature, finding that signature in the database and deleting it, incurring at least another 4 disk input/output (I/O) operations.

Thus it can be seen that the performance penalty of deduplication in previously attempted solutions such as these is considerable, which is why the performance of previously attempted dedup solutions is mediocre unless massive amounts of computing and DRAM are used. It is to these and other opportunities for dedup performance improvement that preferred embodiments of the present invention are generally directed.

SUMMARY

Some embodiments of the present invention contemplate a system for controlling block duplicates when deduplicating data (Dedup Blocks) to a storage space. The system includes a persistent database of known duplicates stored in the storage space (KD Table), and a non-persistent database of possible duplicates stored in the storage space (PD Table). Computer logic executes programming instructions stored in memory that are configured to index the KD Table according to a value derived from bits of a Dedup Block's hash signature, to index the PD Table according to another value derived by other bits of the Dedup Block's hash signature, to demote known duplicates from the KD Table to the PD Table, and to promote possible duplicates from the PD Table to the KD Table.

DESCRIPTION

Initially, it is to be appreciated that this disclosure is by way of example only, not by limitation. The dedup concepts herein are not limited to use or application with any specific system or application that relies on the convenience and capability of data storage systems and associated applications for the reliable storage and retrieval of data. Thus, although the instrumentalities described herein are for the convenience of explanation, shown and described with respect to exemplary embodiments, it will be appreciated that the principles herein may be applied equally in other types of systems and methods that generally transfer data.

Figure 1:
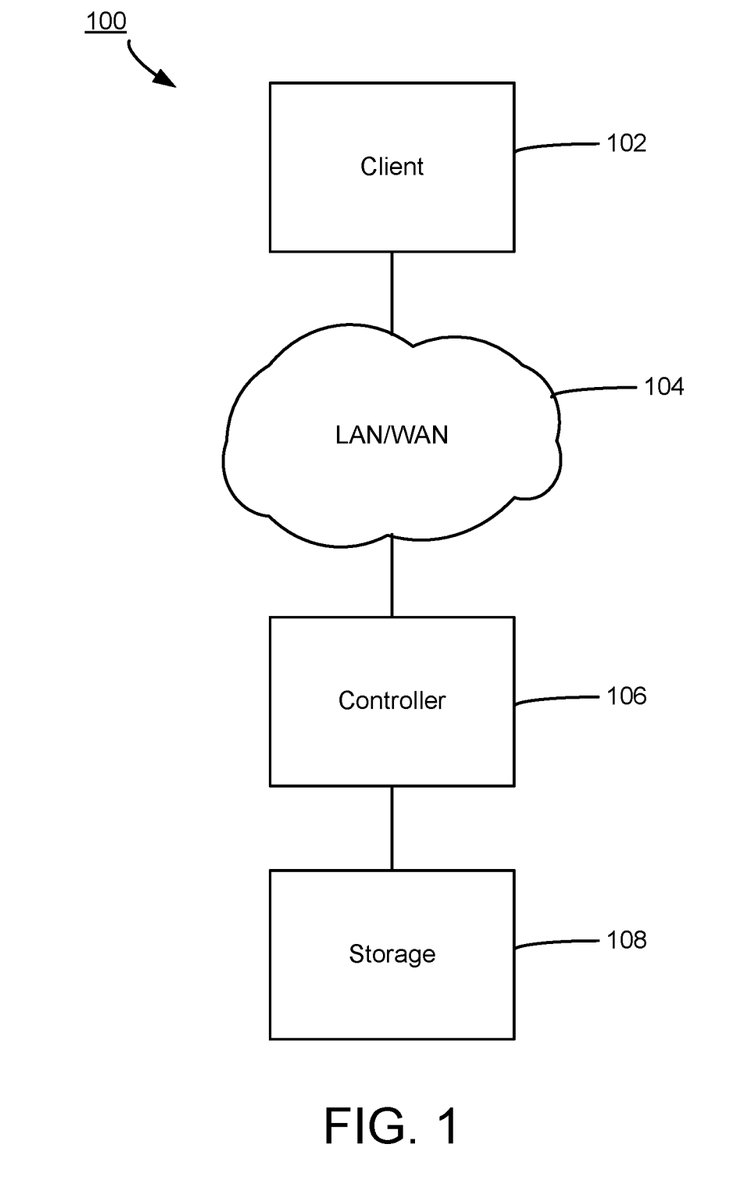
FIG. 1 is a diagrammatic block depiction of a distributed storage system incorporating embodiments of this technology.

FIG. 1 shows an exemplary data processing system 100 including a client device 102, which may be a personal computer (PC) or other device utilized by a user of the system. The host device 102 communicates across a network 104 with a controller 106, which in turn interfaces with a plurality of individual data storage devices that are viewed by the client 102 as a shared storage space 108 via logical mapping across the physical storage locations of the plurality of data storage devices. Preferably, the network 104 is a local area or wide area network (LAN/WAN) using Internet protocol (IP) networking infrastructure for communicating over the World Wide Web.

It will be appreciated that the representation of the system 100 in FIG. 1 and elsewhere is highly simplified, as any number of additional features and components may be incorporated into the system as desired. Alternative configurations may include additional client devices; multiple types and hierarchies of networks; the use of redundant controllers to facilitate fail over and fail back redundancy capabilities; multiple types and configurations of data storage arrays within the system, and so on.

The data storage array is capable of storing data in a RAID (redundant array of independent devices) configuration. As will be recognized, RAID storage involves distributing a set of data across multiple independent data storage devices to enhance data integrity and system reliability. A number of RAID conventions are known in the art, such as but not limited to RAID-0 (which utilizes block level striping across multiple storage devices), RAID-1 (data mirroring), RAID-5 (data striping with distributed parity) and RAID-6 (data striping with double distributed parity). By this, the controllers 112 can advantageously employ predetermined fault tolerance arrangements in which parallel, redundant links store at least some of the user data so that a redundant copy of the user data can be retrieved or reconstructed in the event that the primary copy of the user data becomes unavailable.

Figure 2:
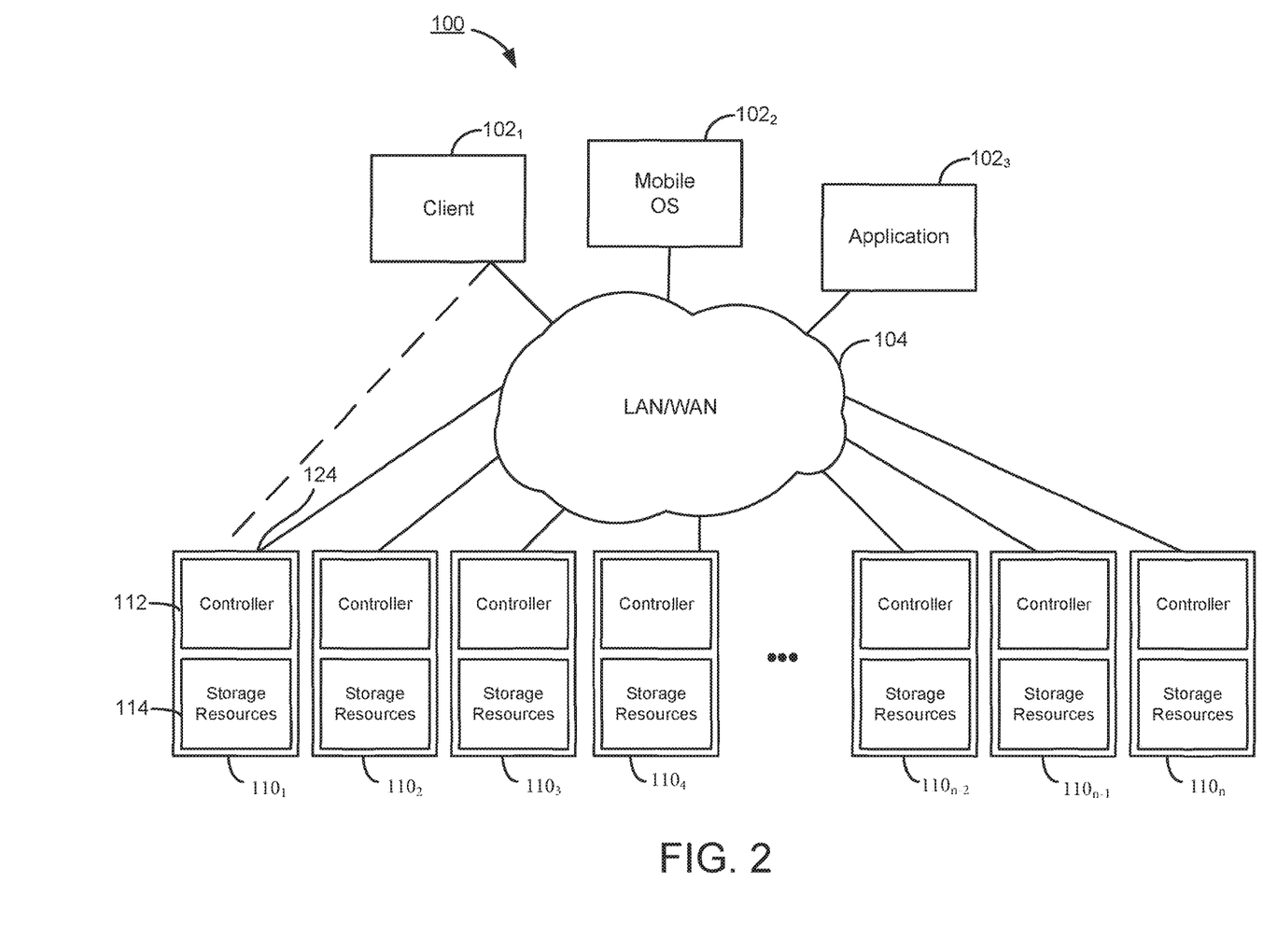
FIG. 2 is a more detailed depiction of the storage system of FIG. 1.

FIG. 2 diagrammatically expands the computer system 100 to include multiple clients 102 that are networked to multiple network-attached intelligent storage elements (ISEs) 110 via the network 104. Each ISE 110 includes a controller 112 having top-level control of data transfers to and from a set of data storage resources 114, such as in these illustrative embodiments a data storage device array (storage space) 114. The controller 112 typically includes redundant storage controllers sharing the respective storage space 114. The controller 112 may also individually buffer data being transferred between the clients 102 and the respective storage space 114 to optimize I/O throughput performance, such as by employing writeback commands that temporarily store user data and acknowledge the write as being complete before that transfer of user data is actually completed via the storage space 114.

The clients 102 access applications resident in the ISEs 110 via a respective network interface 124, which routinely requires the transfers of data to and from the respective storage space 114. Each ISE 110 provides blocks of data storage capacity for storing the data over various selected communication protocols such as serial ATA, serial SCSI, and fibre-channel, with enterprise or desktop class storage medium making up the data storage device array.

The present technology fundamentally improves the way the storage controller 112 executes dedup steps to prevent storing duplicate Dedup Blocks in the storage space 114. This description presents illustrative embodiments of the claimed technology that conduct dedup on incoming data blocks on fixed boundaries and having a size of 8 KiB (8192 bytes). These illustrative embodiments are not limiting of the contemplated embodiments, because in alternative embodiments the Dedup Blocks are not necessarily on fixed boundaries or any particular size.

To improve dedup performance, there are key assumptions in play dealing with how operating systems and applications use a data storage space. The first assumption is pretty basic, most write operations do not write duplicate data and do not overwrite existing duplicate data; they overwrite unique data with different unique data. Based on this assumption, the functions of a dedup data structure in accordance with these embodiments can be divided into two general categories. First, detecting whether an incoming Dedup Block is a new duplicate of an existing duplicate data block somewhere in the shared data space. Second, detecting whether an incoming Dedup Block might be a new duplicate of an existing unique data block somewhere in the shared data space. These functions are performed by interrelating data structures including those referred to herein as a Known Duplicates (KD) Table, a KD Filter, and a Possible Duplicates (PD) Table, as discussed in detail below.

The second assumption is that while the dedup ratio of user data to deduped data may be, for example, 3:1, the majority of stored Dedup Blocks are unique; it is the large average multiplicity of the shared Dedup Blocks that drives the overall ratio. For example, a storage space containing 200 TB of user data and 64 TB of deduped data actually might contain 50 TB of unique user data and 150 TB of duplicated user data in the form of an average of 9.7 instances of the same 14 TB of shared Dedup Blocks. To leverage this second assumption, incoming Dedup Blocks can be compared against all shared Dedup Blocks using a KD Table that only contains the signatures of shared Dedup Blocks, namely, existing Dedup Blocks with more than one instance. This makes the KD Table much smaller than in previously attempted solutions, about 3-5 times smaller, and thus a larger fraction of it will fit in DRAM, although that is a secondary cause of its increased performance.

Figure 3:
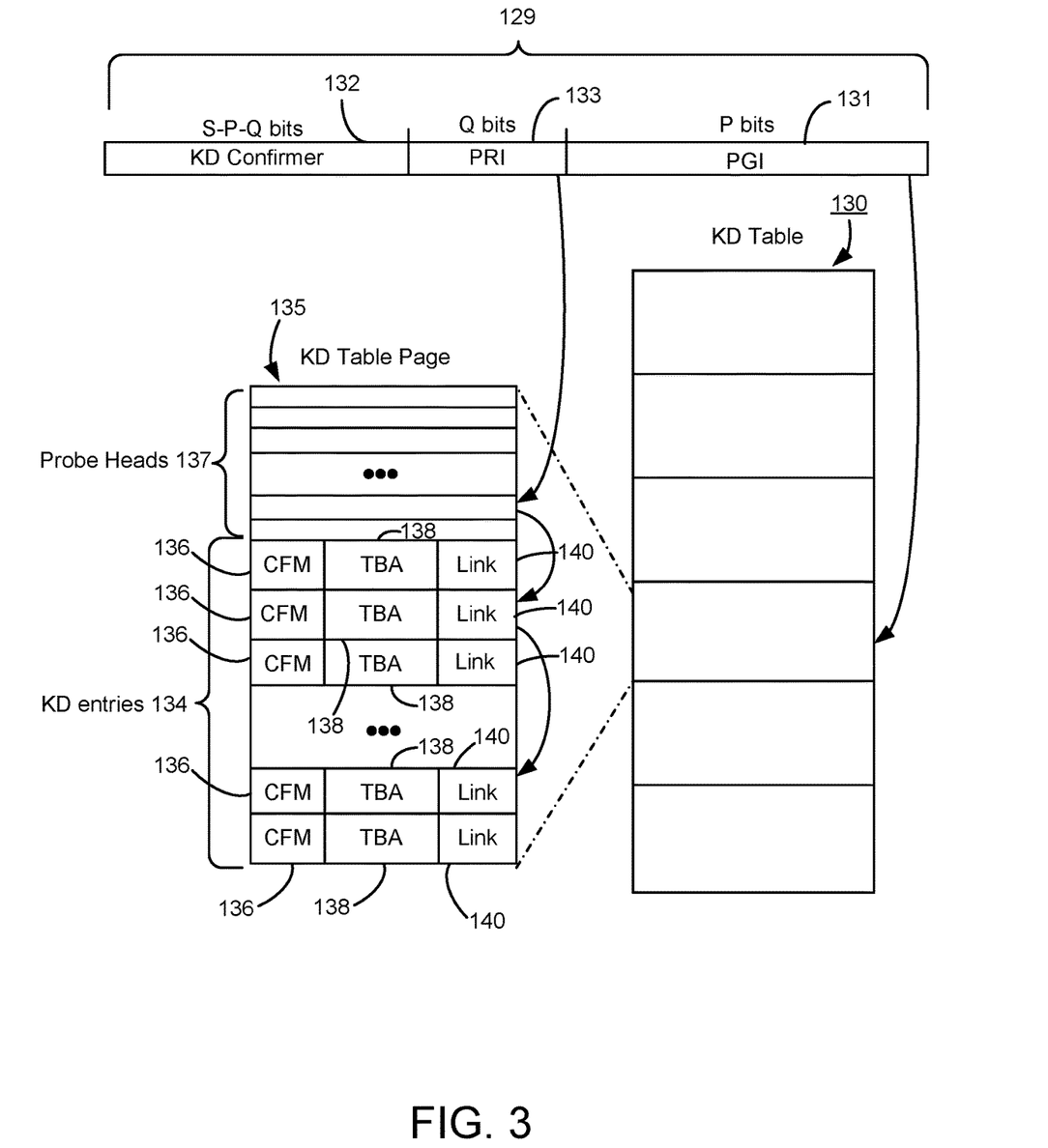
FIG. 3 diagrammatically depicts the Known Duplicates (KD) Table constructed in accordance with illustrative embodiments of this technology.

FIG. 3 diagrammatically depicts a KD Table 130 that is constructed in accordance with embodiments of this technology. Generally, incoming Dedup Blocks under certain circumstances search the KD Table 130 for the locations of certainly stored duplicates. The KD Table 130 is only populated with information about known duplicates, hence the name. A paginated data construct (bucket hash) is well suited because the KD Table 130 can be larger than memory. FIG. 3 also depicts the incoming Dedup Block's hash signature 129. To search the KD Table 130, the signature 129 defines a page index (PGI) 131 of size P bits and a probe head index (PRI) 133 within the KD Table page of size Q bits. The KD Table page 135 selected by the PGI field 131 is read into memory (if it is not already there) and the probe head 137 indexed by the PRI field 133 is examined. If this probe head contains the index of a KD entry 134, then the confirm (CFM) field 136 of the KD entry 134 is compared against the KD Confirmer field 132 of the signature bits 129. If these fields match, the signature has been found in the KD Table 130. If not, the Link field 140 of the KD entry 134 is examined, and if it contains the index of another KD entry 134 then the search continues there. If the probe head 137 or any Link field 140 does not contain the index of a KD entry 134, the signature was not found in the KD Table page 135. Note that all entry indexes in this search are interpreted as being within the KD Table page 135, so a maximum of one page read is needed to see if a signature 129 is in the KD Table 130.

Each entry 134 in the KD Table 130 for a stored Dedup Block contains the CFM field holding the KD Confirmer field 132 of the signature of the entry, the target block address (TBA) 138 of the block (i.e. where it is in the storage space), and the pointer 140 to the next entry in the chain of hash table entries within the same KD Table page. In these illustrative embodiments a KD Table entry can include 37 bits of TBA 138, 8 bits of link 140, and 19 bits of CFM 132, for a total of 64 bits or 8 bytes. The size of a KD page can be 2 KiB (2048 bytes), which holds 223 KD Table entries and 256 8-bit probe heads 137 (Q=8), plus overhead.

The KD Table 130 should have a low enough load factor, the ratio of used slots to total slots across the entire table, that the probability of a page becoming full is less than some small limit, say one in a million. Incoming Dedup Blocks that are newly detected duplicates would not be able to be added to a full page of the KD Table, so they would have to be treated as unique. This would reduce the space efficiency of deduplication by a tiny amount if one in a million incoming Dedup Blocks were treated this way. A good hash function behaves statistically like a uniform random number generator, so using statistical analysis it can be shown that if the load factor is less than 0.73 (for example, if the average KD Table page contains no more than 163 occupied entries in the illustrative embodiment) the probability that any given KD Table page will be full is less than one in a million. So the value of P (the number of bits in the PGI field 131 of the Dedup Block's signature 129) for a given system can be determined from the amount of duplicate storage to be supported. In the illustrative embodiment of a KD Table 130 of $2^P$ pages would support (2P*163)*8192 bytes of duplicate dedup storage, so with 14 TB of duplicate storage, the value of P should be at least 24. This value of P can be picked at the creation of the storage system, or a smaller initial value can be picked and the KD Table 130 can be implemented as a dynamically expandable hash table which grows by factors of 2, with each hash bucket page being split into two new hash bucket pages by, in the illustrative embodiment, incrementing P (and thus the size of the PGI field 131 and the placement of the PRI field 133 and KD Confirmer field 132) when the average KD Table contains more than 163 entries.

To insure that all entries in the KD Table 130 represent shared Dedup Blocks in the storage space, reducing the multiplicity of any shared Dedup Block to 1 (via deletion or overwrite) must remove that block from the KD Table 130, since it is no longer a duplicate of any other block. That requires reading the stored Dedup Block and computing its signature. By the first assumption above, these circumstances are much rarer than overwrites of unique data, so the extra data reads, KD Table reads and writes, and signature computations are not unduly burdensome. This technology doesn't use the KD Table 130 when detecting that the data of an incoming Dedup Block is equal to the data contained in some existing unique Dedup Block (described below), so it is not necessary to add unique incoming Dedup Blocks to the KD Table 130. Given the assumption that most incoming data is unique, this reduction in table maintenance I/Os provides much of the significantly increased performance that is realized by this technology.

The nature of the KD Table 130 greatly reduces the number of table writes, as entries are not added and/or deleted when unique data is written and/or overwritten. Additional performance improvement may be gained by avoiding a read of the KD Table 130 in the process of checking an incoming Dedup Block's signature against all stored duplicated Dedup Blocks, through the use of a KD Filter.

A Bloom filter is a data structure, known to those skilled in the art, for quickly determining if an entry might be in a large table. A Bloom filter of order k includes a bitmap and K independent hash functions that generate indexes into the same bitmap. To insert an object into a Bloom filter of order k, calculate the k independent hash indexes of the object and set the k bits in the bitmap. To check an object in a Bloom filter of order k, calculate the k independent hash indexes of the object and test all k resulting bits in the bitmap. If any of these bits are not set, the object is not in the underlying table so the table doesn't have to be searched for it.

However, a traditional Bloom filter has two significant drawbacks in a dedup implementation. First, a Bloom filter of order k requires the calculation of k independent hash values on the incoming Dedup Block, multiplying the signature compute time by at least a factor of k. Second, Bloom filters were not designed to deal with deletion of entries from the underlying table. Deleting an entry from the underlying table requires completely rebuilding the Bloom filter, because each bit in the Bloom filter is an OR of different hashes of different table entries, and OR operations cannot be undone. Rebuilding a Bloom filter for the KD Table 130 would be a huge overhead burden, involving rereading every shared Dedup Block (14 TB of data this illustrative) because at most one of the k hashes used by the Bloom filter would be stored in the KD Table 130.

Figure 4:
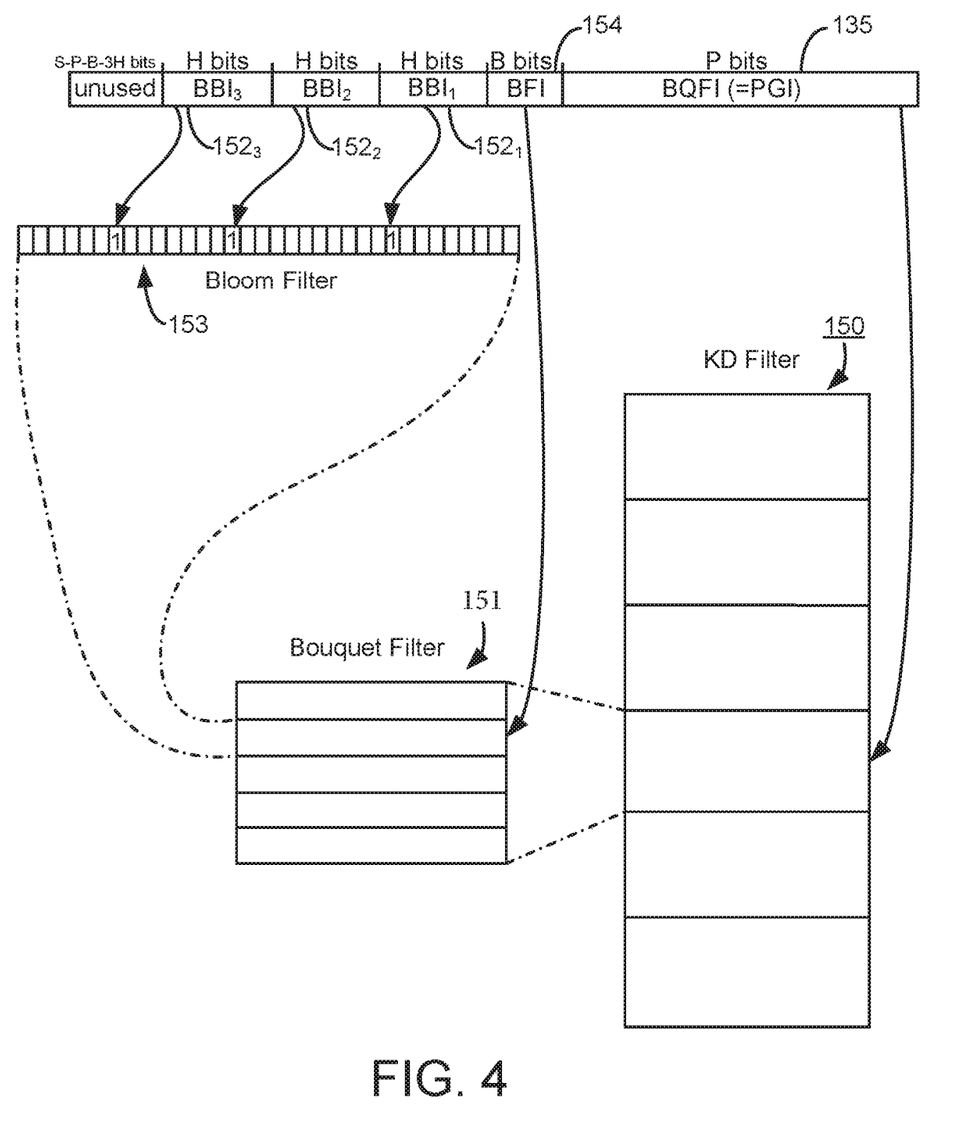
FIG. 4 diagrammatically depicts a KD Filter constructed in accordance with illustrative embodiments of this technology.

FIG. 4 diagrammatically depicts a KD Filter 150 in accordance with illustrative embodiments of this technology, generally formed by an array of Bouquet filters 151, each corresponding to one KD Table page and each including an array of Bloom filters 153.

When an entry is entered into the KD Table 130, the BQFI field 135 of the signature (identical to the PGI field 131 of the signature) is used to select one Bouquet filter 151 from the KD Filter 150. A second BFI field 154 of the signature is then used to select a Bloom filter 153, of length $2^H$ bits, from the Bouquet filter 151. The three fields $BBI_1$ $152_1$, $BBI_2$ $152_2$, and $BBI_3$ $153_3$ of the signature are then used to set three individual bits in the selected Bloom filter 151 to a set state (1).

Before looking up a signature in the KD Table 130, the KD Filter 150 is accessed to see if the signatures might be in the KD Table 130. The BQFI field 135 of the signature (identical to the PGI field 131 of the signature) is used to select one Bouquet filter 151 from the KD Filter 150. A second BFI field 154 of the signature is then used to select a Bloom filter 153, of length $2^H$ bits, from the Bouquet filter 151. The three Bloom filter bits selected by fields $BBI_1$ $152_1$, $BBI_2$ $152_2$, and $BBI_3$ $152_3$ of the signature are then examined. If all three bits are in a set state (1), the signature might be in the KD Table 130. If any of those three bits are in a clear state (0), the signature is definitely not in the KD Table 130, so there is no need to read and search the appropriate KD Table page 135.

When an entry is deleted from the KD Table 130, the appropriate Bloom filter 153 that covers that entry must be rebuilt—that's the inherent nature of Bloom filters. So the BQFI field 135 of the signature (identical to the PGI field 131 of the signature) is used to select a Bouquet filter 151 from the KD Filter 150. A second BFI field 154 of the signature is then used to select a Bloom filter 153, of length $2^H$ bits, from the Bouquet filter 151. All of the bits of that Bloom Filter are set to clear state (0). Then a subset of the entries in the KD Table page 135 indexed by the PGI field 131 of the deleted entry (identical to the BQFI field 131 of the signature) are examined, by selecting those probe heads 137 in the KD Table page 135 whose PRI 133 has its B low-order bits equal to the BFI field 154 of the deleted signature. These are the only probe heads in the KD Table page 135 that contributed to the same Bloom filter 153 as the deleted signature. The probe chain of each of these probe heads 137 are traced in the same manner as when looking up a signature in the KD Table page 135. For each KD entry 134 found, its signature is reconstructed from the PGI 131 of the KD Table page 135, the PRI 133 of the probe head, and the CFM field 136 of the entry. The $BBI_1$ $152_1$, $BBI_2$ $152_2$, and $BBI_3$ $152_3$ fields of that reconstructed signature are then used to set three individual bits in the Bloom filter 153 being reconstructed to a set state (1). At the end of this process, the Bloom filter 153 has been rebuilt to exclude the deleted KD entry 134. In illustrative embodiments of this technology, B=2, so in a KD Table 130 with 160 occupied entries an average of (160/22)=40 entries will have to be examined to rebuild the appropriate Bloom filter 153. This is many orders of magnitude smaller than the billions of entries that would need to be examined to rebuild a classic Bloom filter that covers the entire KD Table 130.

The size of the Bloom filters 153 in bits and the number of BBIi fields in the signature that are used to index those Bloom filters 153 may vary in different embodiments. Research and experiment has shown that the array of individual Bloom filters 153 is approximately as effective as one single large Bloom filter covering the entire KD Table and occupying the same DRAM space as the KD Filter, as long as H is not less than 6—i.e., the individual Bloom filters should be at least 64 bits in size.

The KD Table 130, accompanied by the KD Filter 150, is wonderfully efficient for lookups, and pretty good for deletes (which should be uncommon anyway), but how do entries get added to it? An optimizing assumption here is that most unique Dedup Blocks become duplicated during normal system operation in one of the three following ways: (1) the duplicate Dedup Block is written shortly after the stored unique Dedup Block was written, such as a mail attachment sent to several mailboxes, (2) the duplicate Dedup Block is written shortly after the stored unique Dedup Block was read, such as an explicit file copy, or (3) the duplicate Dedup Block is part of a very large sequential write stream written as either the initial load of the system from an external source, or the in-place conversion of the system from firmware that doesn't support dedup to firmware that does.

Figure 5:
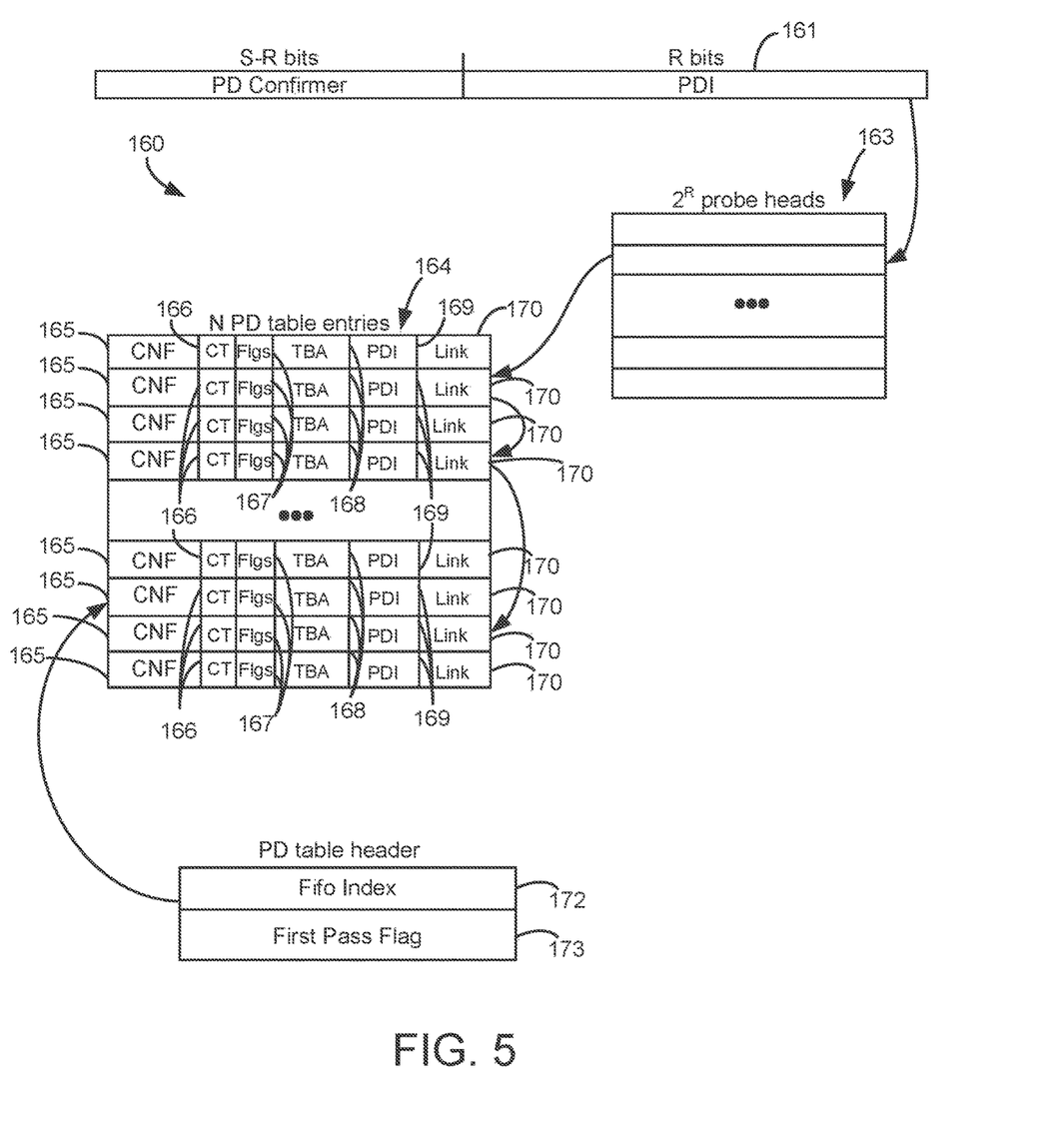
FIG. 5 diagrammatically depicts a Possible Duplicates (PD) Table constructed in accordance with illustrative embodiments of this technology.

To leverage this assumption, FIG. 5 diagrammatically depicts a sliding window data structure called the Possible Duplicates (PD) table 160 that is constructed for holding a select set of signatures. The set can be defined in terms of any helpful parameter, such as temporal or data type parameters and the like. For purposes of these illustrative embodiments, but without limitation, the PD Table 160 can be populated with signatures of the N most recently read or written unique Dedup Blocks. The PD Table 160 is constructed so that a comparison can be made of an incoming unique Dedup Block against all existing entries before writing it. The PD Table 160 is indexed by a PD Table index 161 formed by R bits of the signature 129.

Because of the nature of copy operations and the large sequential write operations performed by initial system loads and in-place conversions, storing the signatures of every unique Dedup Block in a multi-block I/O stream is not necessarily warranted, because instead only the signature of the first Dedup Block of each extent of all-unique Dedup Blocks being read or written can be stored. If the first block is later matched by an incoming Dedup Block of a write operation, then each subsequent block in the extent can be explicitly checked (by comparing data) against a subsequent sequential incoming Dedup Block of the current write operation. This trades a large reduction in the needed size of the PD Table for a modest decrease in space efficiency of deduplication.

The value of N, the size of the PD Table 160, depends on the circumstances under which it is desired to capture new duplicates. It's likely for the two writes of a multi-copy application, or the read and write of a file copy, to be separated in time by no more than a half-second. In that case, a controller doing I/O that results in the creation of 300,000 new table entries per second in the PD Table 160 could detect them if N>150,000. Then there are edit operations, where data is read and then, after a delay, substantially the same data might be written somewhere else. Because most modern editors implement auto-save, a temporal window such as 10 minutes (600 seconds) could be adequate, corresponding to N≥180,000,000 if the 300,000 table entries were added to the PD Table 160 every second. As with the size parameter P of the KD Table 130, N can be specified as a fixed quantity, or the PD Table 160 can be designed to dynamically grow (and shrink) based on the type and intensity of the I/O workload observed over an interval of time.

The PD Table data structure itself must be something that is fast to search, insert into, and delete from, and implements a sliding window where the insertion of new entries automatically deletes the oldest entries. Once again, a hash table with chained collision resolution is used as the search mechanism in these illustrative embodiments, without limitation, and more particularly a unified (non-bucketed) hash table existing completely in volatile DRAM. The PD Table 160 could be persistent in alternative embodiments, but for these illustrative embodiments a volatile table will only fail to detect new duplicates around system crashes, which don't occur very often and would therefore have minimal impact on the space efficiency of deduplication.

In these illustrative embodiments the PD Table 160 is structured as a ring buffer (first in-first out, FIFO) that can be indexed as a hash table. The Probe Heads array 163 contains the index of the first entry of each hash probe chain. Fifo Index 172 is the ring buffer index into the PD Table Entries array 164, initialized to 0, and First Pass flag 173 is a Boolean that is initialized to True. The ratio of the number of entries in the PD Table Entries array 164 (N) to the number of entries in the Probe Heads array 163 ($2^R$) determines the average number of entries per hash probe chain. In our illustrative example with N=180,000,000, a value of 26 for R would result in hash probe chains that are an average of 2.7 entries long.

Insertions and deletions always occur as a combined operation—delete the oldest entry in the PD Table Entries array 164 (if the First Pass flag 173 is not set true) and use that slot in the PD Table Entries array 164 to store the new entry. New entries are always inserted at the tail of the respective hash probe chain.

The Link 170 field of an entry contains the index of the next entry on this entry's probe chain. The last entry in the chain contains a special Link 170 index (e.g. 0xFFFFFFFF).

The PDI 169 field of each entry contains the index in the Probe Heads Array 163 behind which this entry is linked, and is used to delete the entry. When a Dedup Block needs to be inserted into the PD Table 160 and the First Pass flag 173 is false, the PDI 169 field of the PD Table entry 164 indexed by Fifo Index 172 is obtained and used as an index into the Probe Heads array 163 to delete the first entry of its hash probe list (which is always the PD Table entry 164 indexed by Fifo Index 172, and the oldest entry in the PD Table 160, since we have come completely around the ring) is deleted by delinking it from its hash probe list. That newly-freed PD Table entry 164 entry is then filled in with the information about the incoming Dedup Block, inserted at the tail of its appropriate hash probe chain (based on the PDI 161 of its signature 129), and the index of the Probe Heads array 163 entry for that hash probe chain is stored in the fifoProbe field of the new entry. The FifoIndex value is then incremented and, if it now equals N, it is set to 0 and the First Pass flag 173 is set to false. The TBA field 168 of each entry contains the Target Block Address of the Dedup Block, its location in the storage system.

The flags field (Flgs) 167 of each PD Table entry 164 contains at least a resurrect flag which, if set, will cause the entry to not be deleted from the PD Table 160 when it is reached by fifo Index 172 (when its slot is needed to store a new entry). Instead, it will be delinked from the beginning of its hash probe list obtained by indexing into the Probe Heads array 163 with the PDI 169 field of the PD Table entry 164, reinserted at the end of that list, and its resurrect flag will be cleared. The fifo Index 172 will then be incremented (and wrapped if necessary), and the next entry in the ring will be considered for deletion instead.

The count (CT) 166 field of each entry contains a 5-bit count of the number of additional unique Dedup Blocks in successive TBAs after the block specified by the entry. A 5-bit field limits these contiguous extents to contain no more than 32 Dedup Blocks, and larger extents could be divided into chunks of 32 or fewer Dedup Blocks and each chunk entered into the PD Table 160 separately. All of the blocks in the extent should be unique at the time the entry is added to the PD Table 160. This field is only non-zero if the optional optimization for large I/O operations, described below, is implemented.

This technology uses the KD Table 130 (and its associated KD Filter 150) and the PD Table 160, plus two persistent structures familiar to those with knowledge in the art of storage virtualization, a virtual-to-physical map (MAP) structure that translates a user virtual address of a block of storage (in this case a Dedup Block) to an internal storage address, and a target reference count (TRC) structure that stores the multiplicity of a block (again, in this case, a Dedup Block) at a given internal storage address. A special value UNMAPPED is used in the MAP table to indicate that a user virtual address is currently unmapped to any internal storage (i.e., it has never been written). A value of 0 in the TRC entry for an internal storage address means that the address is unallocated, a value of 1 means the address contains a unique Dedup Block, and a value of more than 1 means the address contains a Dedup Block which appears that many times in the totality of all users' virtual address spaces.

Figure 6:
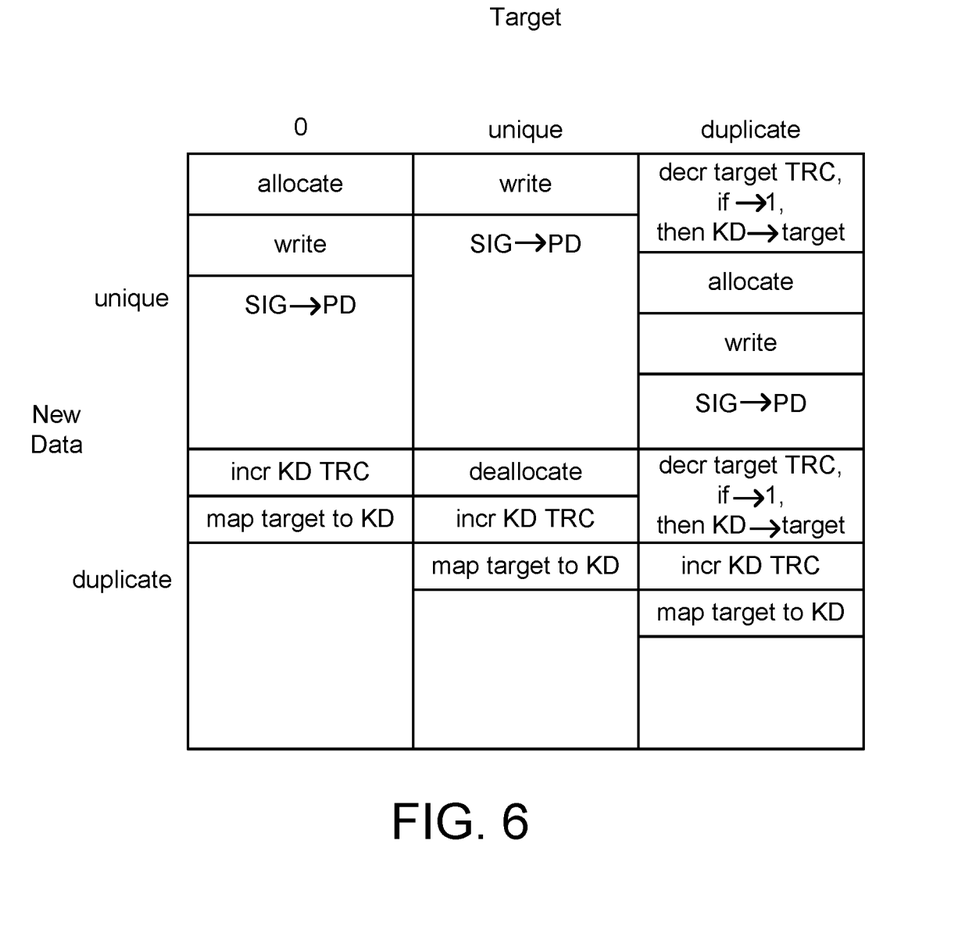
FIG. 6 is a high-level summary of the data structure maintenance in the devices depicted in FIGS. 3-5 and the descriptions thereof in carrying out the methodologies depicted in FIGS. 7-9 and the descriptions thereof.

When an incoming Dedup Block is received on a write operation, a check of the MAP indicates if the Dedup Block has been mapped, and if it has been, a check of the TRC indicates the multiplicity of the target address. If the Dedup Block is mapped, then the TRC must be ≥1. FIG. 6 is a high-level summary of the data structure maintenance that is necessary depending on the target TRC and whether the incoming Dedup Block is unique or duplicate.

For a unique incoming Dedup Block (i.e., a Dedup Block having a signature 129 that does not appear in the KD Table 130 or the PD Table 160, or who does appear in one of those tables but having data that does not compare equal to the data in the Dedup Block at the matching KD Table entry's TBA 138 or matching PD Table entry's TBA 168), if the MAP entry for the user virtual address of the write is UNMAPPED then a storage location is allocated and stored into the MAP for that virtual address, the Dedup Block is written to that storage location, the TRC of that location is set to 1, and the signature 129 of the incoming Dedup Block is added to the PD Table 160 along with a TBA 168 equal to the newly allocated storage location. If, for the unique incoming Dedup Block, the MAP entry for the user virtual address of the write indicates it is mapped to an internal storage location (target) and the data already stored at the target is unique (i.e. the target's TRC is 1), then the incoming Dedup Block is simply written to the target and the signature 129 of the incoming Dedup Block is added to the PD Table 160 with a TBA 168 equal to the target address. Note that the Dedup Block previously stored at the target might already have been stored in the PD Table 160. If so, that PD Table entry is now obsolete. If it is convenient to do so (e.g. if the target Dedup Block is in the storage system's DRAM cache) the PD Table entry for the old stored block can be deleted, but it is not necessary, because when using short signatures a signature match always causes a data compare, the obsolete entry will never cause data corruption, although it may incur a performance penalty. If, for the unique incoming Dedup Block, the MAP entry for the user virtual address of the write indicates it is mapped to a target and the data already stored at the target is a duplicate (i.e. the target's TRC is >1), then the target TRC is decremented. If the decremented target TRC=1, then the target Dedup Block is read in and its signature is computed and removed from the KD Table 130, and a new target for the incoming user virtual address is allocated, stored in the MAP entry for the user virtual address, and the signature 129 of the incoming Dedup Block is added to the PD Table 160 with a TBA 168 equal to the new target address.

For a duplicate incoming Dedup Block (an incoming Dedup Block having a signature 129 appearing either in the KD Table 130 or the PD Table 160, and having data that compares equal to the Dedup Block at the matching KD entry's TBA 138 or matching the PD entry's TBA 168), if the MAP entry for the user virtual address of the write is UNMAPPED then the TRC entry for the TBA is incremented and the TBA is stored in the MAP entry for the user's virtual address. If, for the duplicate incoming Dedup Block, the data stored at the target is unique, then the target is deallocated, the TRC entry for the TBA is incremented, and the TBA is stored in the MAP entry for the user's virtual address. If, for the duplicate incoming Dedup Block, the data stored at the target is a duplicate, then the target TRC is decremented, if the decremented target TRC=1 then the target Dedup Block is read in and its signature 129 is computed and is removed from the KD Table 100, the TRC entry for the TBA is incremented, and the TBA is stored in the MAP entry for the user's virtual address.

Figure 7:
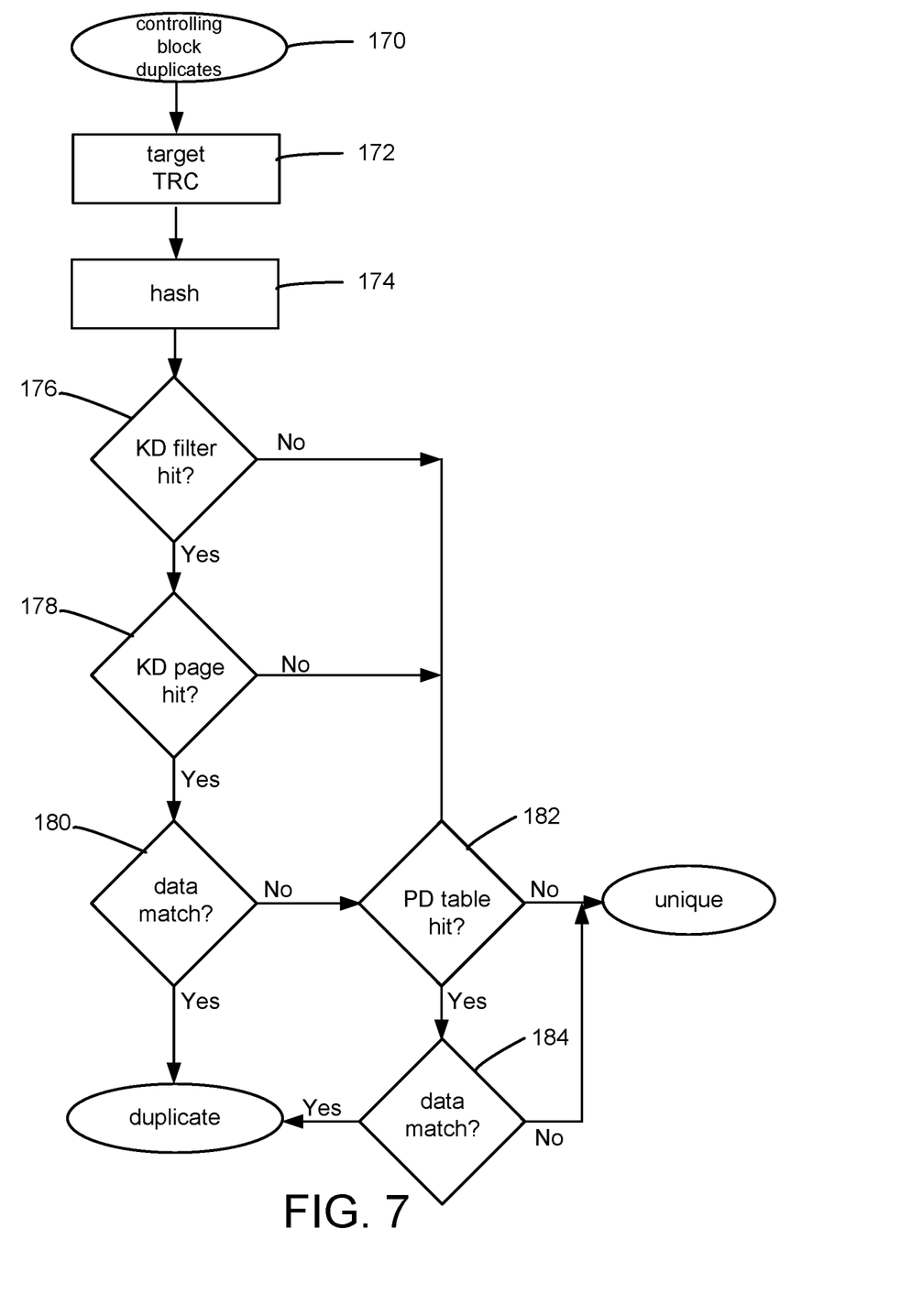
FIGS. 7-9 depict flowcharts of steps in practicing a method for CONTROLLING BLOCK DUPLICATES in accordance with illustrative embodiments of this technology.

FIG. 7 is a flowchart depicting steps for practicing a method of CONTROLLING BLOCK DUPLICATES 170 in accordance with embodiments of this technology to yield the results that are summarized in FIG. 6. The process begins in block 172 with reading the target TRC from the MAP, which might return the UNMAPPED, and if it is not UNMAPPED then obtaining the TRC for the target, which indicates whether the data already stored at the target is unique or a duplicate. The incoming Dedup Block is then hashed in block 174 to obtain its signature that defines the various indices into the KD Table, KD Filter, and PD Table.

In block 176 it is determined whether signature passed the KD Filter, indicating that the signature might be in the KD Table. If the signature passed, then in block 178 it is determined whether the signature appears in the KD Table, meaning there is a KD Table entry for that signature. If there is such a KD Table entry, then in block 180 the incoming Dedup Block data is compared against the data of the Dedup Block stored at the storage address given by the TBA field of the KD Table entry. If the data matches, then the incoming Dedup Block is deemed a duplicate of the block at the TBA.

If any of the determinations in blocks 176, 178, or 180 is "no," then in block 182 it is determined whether the signature of the incoming Dedup Block is present in the PD Table. If it is, and in block 184 it is determined that the incoming Dedup Block data is equal to the data of the Dedup Block stored at the storage address given by the TBA field of the PD Table entry, then the incoming Dedup Block is likewise deemed a duplicate of the block at the TBA. If there is no hit in the PD Table in block 182, or if there is a hit in the PD Table in block 182 but the data of the incoming Dedup Block doesn't match the data of the Dedup Block stored at the storage address given by the TBA field of the PD Table entry in block 184, then the incoming Dedup Block is deemed unique.

Figure 8:
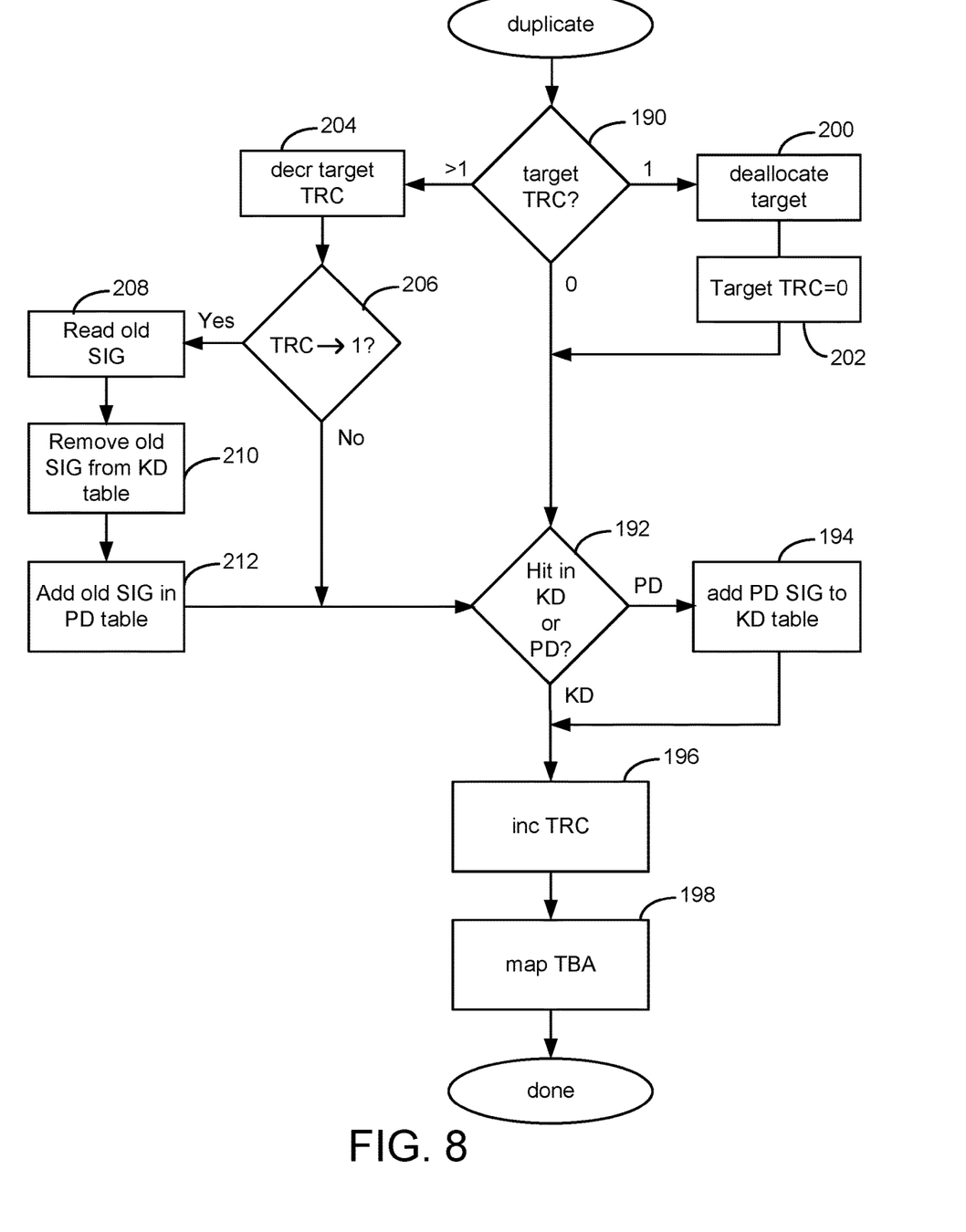

FIG. 8 is a continuation of FIG. 7 for those incoming Dedup Blocks that are deemed to be duplicates. In block 190 the target TRC of the user's virtual address is determined. If the MAP entry for the user's virtual address shows it is UNMAPPED, then the target TRC is presumed to be 0 and process control proceeds to block 192, where it checks whether the duplicate's signature matched an entry in the KD or PD Table in the flowchart of FIG. 9. If the match was in the PD Table, then in block 194 the signature of the incoming Dedup Block is added to the KD Table along with the TBA obtained from the PD Table in FIG. 7, and the appropriate Bloom filter of the KD Filter is updated. In either event, the TRC of the TBA obtained in FIG. 7 is incremented in block 196 and the TBA obtained in FIG. 7 is stored in the MAP entry for the user's virtual address in block 198.

If in block 190 the target TRC of the user's virtual address=1 then the data already stored at the target is unique. In this case the target is deallocated in block 200 and the target TRC is set to 0 in block 202. The process control then passes to block 192 and continues from there as described above, depending on whether the hit was in the KD or PD Table.

If in block 190 it is determined that the target TRC of the user's virtual address is greater than 1, then in block 204 the target TRC is decremented. In block 206 it is determined whether the decremented target TRC=1. If the determination of block 206 is "no," then the process control passes to block 192 and again continues as described above, depending on whether the hit was in the KD or PD Table. If the determination of block 206 is "yes," then the data already stored at the target is now unique as a result of this write and thus must be removed from the KD Table. In that event in block 208 the old Dedup Block stored at the target is read and its signature 129 is computed. In block 210 the old signature 129 is found in the KD Table (it must be there) and removed and the appropriate Bloom filter of the KD Filter is rebuilt due to the deletion. As a policy decision, in block 212 the signature of the old Dedup Block at the target can be entered into the PD Table because it has become unique and might match some subsequent Dedup Block's signature based on the PD Table retention criteria.

Figure 9:
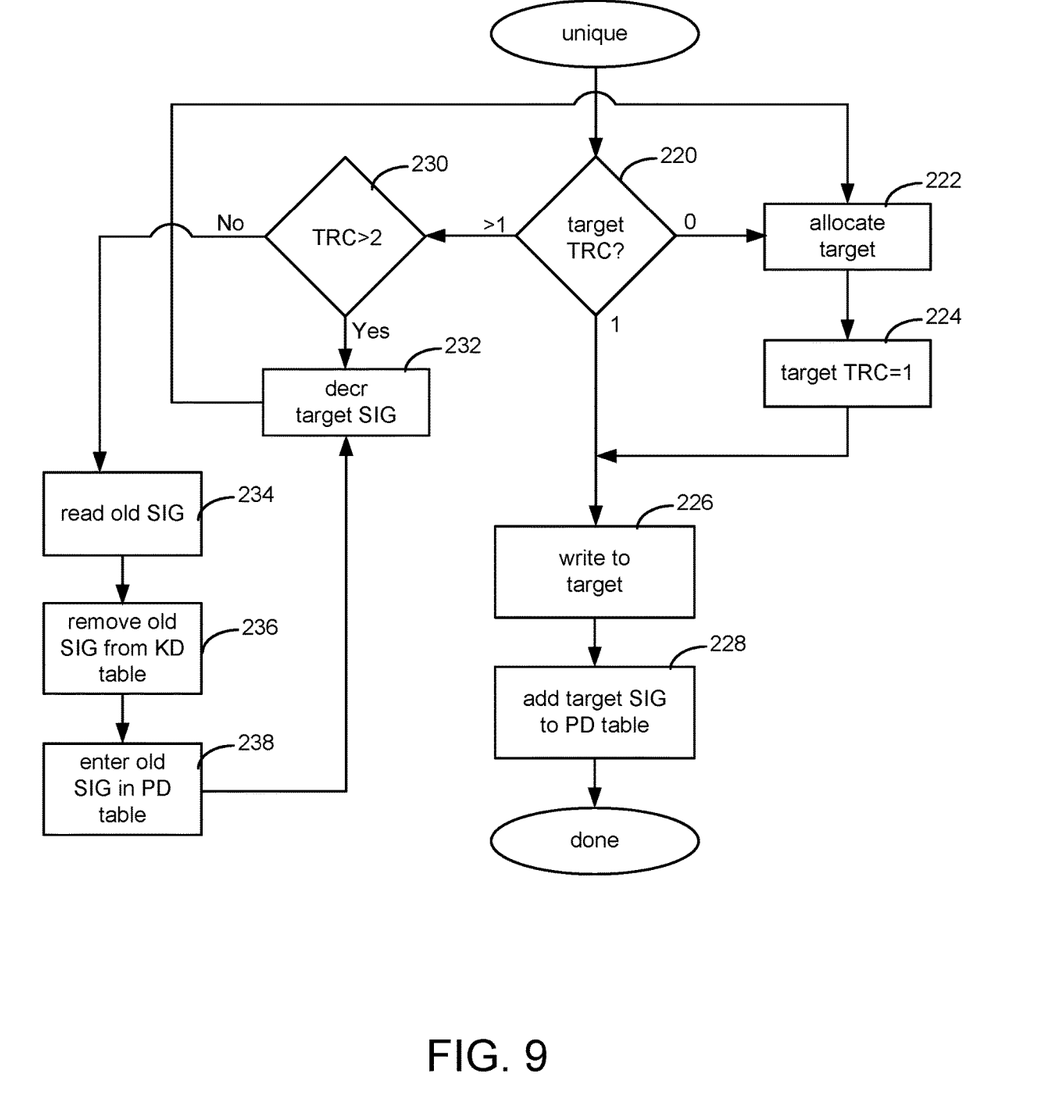

FIG. 9 is also a continuation of the flow chart of FIG. 7 but for those incoming Dedup Blocks that are deemed to be unique. In block 220 it is determined what the target TRC of the user's virtual address is. If the MAP entry for the user's virtual address shows it is UNMAPPED, then the target TRC is presumed to be 0 and process control proceeds to block 222, where the target is allocated and the target TRC is then set to 1 in block 224. The incoming Dedup Block is written to the target in block 226 and entered in the PD Table in block 228, along with the target TBA. If the determination of block 220 is that the target TRC=1, then process control passes to block 226 and proceeds from there as described for TRC=0.

If the determination of block 220 is that the target TRC is greater than 1, and the determination of block 230 is that the target TRC is greater than 2, then the old TRC is decremented in block 232 and then process control passes to block 222 and proceeds from there as if the determination of block 220 was the target TRC=0. However, if it is determined in block 230 that the target TRC is not equal to 2, then the block already stored at the target has become unique as a result of this write, and thus it must be removed from the KD Table. Similar to that described above, in that event in block 234 the old data stored at the target is read and its signature is computed. In block 236 the old signature is found in the KD Table (again, it must be there) and removed and the appropriate Bloom filter of the KD Filter is rebuilt due to the deletion. As a policy decision, in block 238 the signature of the old Dedup Block at the target address can be entered into the PD Table table because it has become unique and might match some subsequent incoming Dedup Block's signature based on the PD Table retention criteria.

The optional optimized handling of large multi-block reads and large multi-block sequential writes first involves detecting such operations, which is a technique well know to those skilled in the art. The definition of what constitutes a large read or a large sequential write is a policy decision of the implementation, but in general it would consisted of at least 8 Dedup Blocks. For a large multi-block read, the signature of the first Dedup Block of the read is computed after the Dedup Block is read from storage and, if it is not in either the KD or PD Table, it is entered into the PD Table 160. The TBA of the storage location is entered into the TBA field 168 of the PD Table entry 164 containing the signature 129 of the Dedup Block, and the number of Dedup Blocks in the read, minus one, is entered into the CT field 166 of the PD Table entry 164 containing the signature 129 of the Dedup Block. For a large sequential write, the signature of the first incoming Dedup Block of the write is processed normally. If it winds up being inserted into the PD Table 160 because it is unique, subsequent Dedup Blocks in the large sequential write operation are handled differently. If block 228 of the process depicted in FIG. 9 is reached, and the TBA of the subsequent Dedup Block immediately follows the TBA of the previous incoming Dedup Block in the large sequential write, then instead of entering the block's signature etc. into the PD Table the CT field 166 of the first Dedup Block's PD Table entry is incremented instead. If any of the above conditions are not met by any subsequent Dedup Block in the large sequential write, this special handling is cancelled for the rest of the incoming Dedup Blocks in the large sequential write operation.

If the optional optimization is implemented, all user writes of multiple Dedup Blocks initially go through the steps depicted in the flowcharts of FIGS. 7, 8, and 9 for each Dedup Block in the write. Once an incoming Dedup Block from the write is shown to be equal to a block having a signature that is in the PD Table 160 with a CT field 166 that is not 0, that is an entry that represents more than a single contiguous stored Dedup Block, the rest of the blocks in the write, if any, use a slightly modified matching algorithm, because it is likely that the rest of the blocks in the current write will also match the subsequent blocks starting at the TBA 168 of the PD Table entry 164. These subsequent blocks do not have their signatures stored in the PD Table 160, so the usual matching process will fail. So, after failing to find a match in the KD Table 130 for the signature of any of the $N^{th}$ subsequent incoming Dedup Block from the same user write, block 182 of the flowchart in FIG. 7 would alternatively check the contents of that incoming Dedup Block directly against the Dedup Block located N−1 blocks after the TBA 168 of the PD Table entry 164 of the Dedup Block that matched the first incoming Dedup Block of the write. If one of these subsequent blocks does not compare equal to its corresponding stored Dedup Block, the modified process is terminated in favor of going back to the original block 182 of the flowchart in FIG. 7.

The optional optimization is particularly effective during initial load of a storage subsystem implementing dedup from an older storage subsystem. The initial load operation generally consists of a series of large sequential writes to the new storage subsystem, so the combination of a large PD Table (possibly dynamically expanded just for this operation) and allowing a single PD entry to represent up to 32 Dedup Blocks allows effective duplicate detection during the initial load operation with very little performance penalty.

The main performance gain from the optimized duplicate detection described in this disclosure comes from not having to enter and delete the signatures of unique Dedup Blocks into a persistent, reliable database (the KD Table), but instead entering them into a much smaller sliding window database that is completely resident in volatile DRAM. A further performance gain comes from the fact that overwritten Dedup Blocks in storage do not need to be read and have their signature recomputed before overwriting so that they can be deleted from any database. Because the KD Table is relatively static, the use of the KD Filter to eliminate most reads of a KD Table page for unique incoming Dedup Blocks significantly reduces the remaining number of non-data I/Os performed by the system. Finally, and least important in most configurations, the reduced size of the KD Table will also improve performance slightly as a larger percentage of that table will cached be in DRAM memory.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention. In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed:

1. A system for controlling block duplicates when deduplicating data to a storage space, comprising:
   a persistent database of known duplicates (KD Table) stored in the storage space;
   a non-persistent database of possible duplicates (PD Table) stored in the storage space; and
   computer logic executing programming instructions stored in memory configured to index the KD Table according to a KD Table page index (PGI) value and a KD table probe head index (PRI) value derived from bits of a hash signature of a respective deduplication block (Dedup Block), to index the PD Table according to a PD Table index (PDI) value derived by other bits of the hash signature, to demote the known duplicates from the KD Table to the PD Table, and to promote the possible duplicates from the PD Table to the KD Table.

2. The system of claim 1, further comprising a digital known duplicates filter (KD Filter) apparatus configured to determine if an incoming Dedup Block might reside in the KD Table, comprising a plurality of bouquet filters individually configured to be indexed by the computer logic according to a bouquet filter index (BQFI) value equal to the PGI value, each bouquet filter having a plurality of Bloom filters individually configured to be indexed by the computer logic according to a Bloom filter index (BFI) value defined by other predetermined bits of the incoming Dedup Block's hash signature.

3. The system of claim 2, wherein the computer logic is configured to determine if the KD Filter contains a plurality of valid Bloom filters corresponding to a KD Table page value by indexing the KD Filter for a hit according to the incoming Dedup Block's BFI value.

4. The system of claim 3, wherein the computer logic is configured, in response to obtaining a valid Bloom filter according to the incoming Dedup Block's BFI and BQFI values, to index the valid Bloom filter for a second hit based on another set of bits $BBI_i$ of the incoming Dedup Block's hash signature, to determine whether the KD Table might contain the incoming Dedup Block according to logic of Bloom filters.

5. The system of claim 4, wherein the computer logic is configured, in response to not getting a first or the second hit, to determine if the PD Table contains the incoming Dedup Block by indexing the PD Table for a third hit according to its hash signature, to deem the incoming Dedup Block a duplicate if either the KD Table or the PD Table contains the incoming Dedup Block, and to deem the incoming Dedup Block unique if neither the KD Table nor the PD Table contains the incoming Dedup Block.

6. The system of claim 1, further comprising a virtual address map (VAM) that maps user addresses to target block addresses (TBAs), and a target reference count (TRC) table holding the reference count for every TBA, and computer logic executing programming instructions stored in memory to modify the VAM and TRC entries, and to modify, add, or delete KD Table and PD Table entries, in response to the inclusion or non-inclusion of an incoming Dedup Block in the KD Table or PD Table, previous contents of the VAM for the virtual address to which the incoming Dedup Block is being written, and the reference count in the TRC corresponding to the TBA obtained from the VAM.

7. The system of claim 6, wherein the computer logic is configured, in response to deeming the incoming Dedup Block a duplicate and determining that the VAM entry for the user address has no TBA, to fetch the incoming Dedup Block's TBA from the KD Table or PD Table, increment the fetched TBA's reference count in the TRC, and store the fetched TBA in the VAM entry for the user address.

8. The system of claim 6, wherein the computer logic is configured, in response to deeming the incoming Dedup Block a duplicate and determining that the reference count of the TBA corresponding to the user address in the VAM indicating the data already-stored at the TBA is unique, to deallocate the TBA, fetch the duplicate's TBA from the KD Table or the PD Table, increment the fetched TBA's reference count in the TRC, and store the fetched TBA in the VAM entry for the user address.

9. The system of claim 6, wherein the computer logic is configured, in response to deeming the incoming Dedup Block a duplicate and determining that the reference count of the TBA corresponding to the user address in the VAM indicating the data already-stored at the TBA has more than two other duplicates, to decrement the TBA's reference count in the TRC, fetch the duplicate's TBA from either the KD Table or the PD Table, increment the fetched TBA's reference count in the TRC, and store the fetched TBA in the VAM entry for the user address.

10. The system of claim 6, wherein the computer logic is configured, in response to deeming the incoming Dedup Block unique and determining that the reference count of the TBA corresponding to the user address in the VAM indicating the TBA is unallocated, to allocate a new TBA and set the reference count of the new TBA in the TRC to one, write the incoming Dedup Block to the new TBA, store the new TBA in the VAM entry for the user address, and add the incoming Dedup Block as a possible duplicate in the PD Table.

11. The system of claim 6, wherein the computer logic is configured, in response to deeming the incoming Dedup Block unique and determining that the reference count of the TBA corresponding to the user address in the VAM indicating the data already stored at the TBA is unique, to write the incoming Dedup Block to the TBA, and add the incoming Dedup Block as a possible duplicate in the PD Table.

12. The system of claim 6, wherein the computer logic is configured, in response to deeming the incoming Dedup Block unique and determining that the reference count of the TBA corresponding to the user address in the VAM indicating the data already-stored at the TBA has more than two duplicates, to decrement the TBA's reference count in TRC, allocate a new TBA and set the reference count of the new TBA in the TRC to one, write the incoming Dedup Block to the new TBA, and add the incoming Dedup Block as a possible duplicate in the PD Table.

13. The system of claim 6, wherein the computer logic is configured, in response to deeming the incoming Dedup Block unique and determining that the reference count of the TBA corresponding to the user address in the VAM indicating first data already stored at the TBA has exactly two duplicates, to hash the first data to obtain a first hash signature, delete a first entry of the KD Table that corresponds to the first hash signature, decrement the TBA's reference count in the TRC, allocate a new TBA and set the reference count of the new TBA in the TRC to one, write the incoming Dedup Block to the new TBA, store the new TBA in the VAM entry for the user address, and enter the first hash signature in the PD Table along with its TBA, thus demoting the first data from a known duplicate to a possible duplicate, and add the incoming Dedup Block as another possible duplicate in the PD Table.

14. The system of claim 6, wherein the computer logic is configured, in response to deeming the incoming Dedup Block a duplicate and determining that the reference count of the TBA corresponding to the user address in the VAM indicating that first data already stored at the TBA has exactly two duplicates, to hash the first data to obtain a first hash signature, delete an entry of the KD Table that corresponds to the first hash signature, decrement the TBA's reference count in the TRC, fetch the duplicate's TBA from either the KD Table or the PD Table, increment the fetched TBA's reference count in the TRC, store the fetched TBA in the VAM entry for the user address, and enter the first hash signature of the first data in the PD Table along with its TBA, thus demoting the first data from a known duplicate to a possible duplicate.

15. The system of claim 14, wherein the computer logic is configured, in response to deeming the incoming Dedup Block a duplicate by finding that the PD Table contained the incoming Dedup Block, to promote the incoming Dedup Block from a possible duplicate in the PD Table to a known duplicate in the KD Table by removing the incoming Dedup Block's entry from the PD Table and entering the incoming Dedup Block in the KD Table.

\* \* \* \* \*